Dec. 9, 1969　　　L. J. MANN ET AL　　　3,482,413
ROTATING SPINDLE ICE MAKER
Filed May 23, 1968
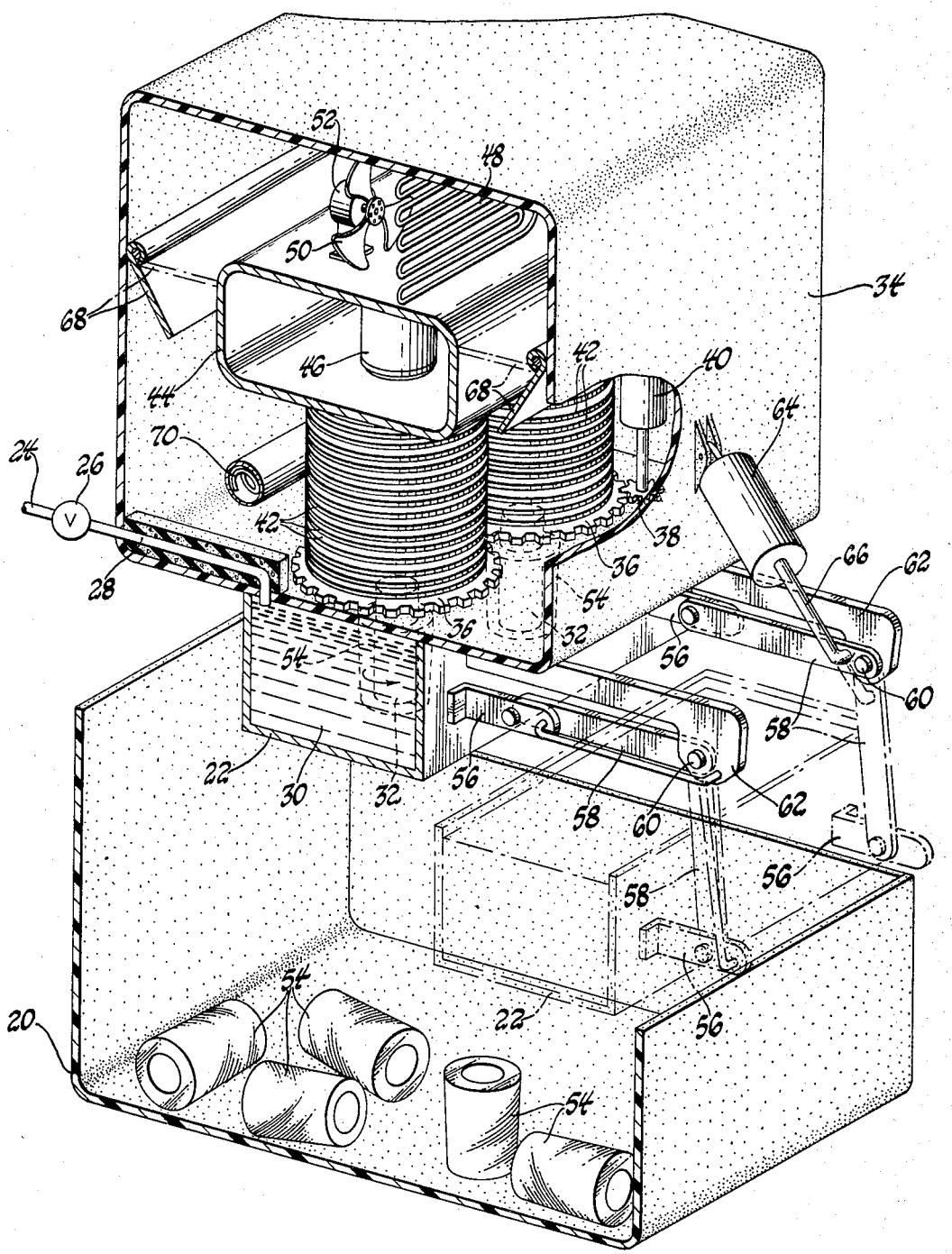
INVENTORS
Leonard J. Mann &
BY Victor A. Williamitis
Carl a. Stickel
ATTORNEY 3,482,413
ROTATING SPINDLE ICE MAKER
Leonard J. Mann, and Victor A. Williamitis, Dayton, Ohio, assignors to General Motors Corporation, Detroit, Mich., a corporation of Delaware
Filed May 23, 1968, Ser. No. 731,438
Int. Cl. F25c 1/08
U.S. Cl. 62—68                                                6 Claims

ABSTRACT OF THE DISCLOSURE

In the preferred form, a plurality of upright refrigerated spindles are immersed in the liquid to be frozen and rotated upon their axes at a speed of about 50 r.p.m. during the freezing of the liquid thereon. At the conclusion of the freezing, the container containing the liquid is moved aside and an electric heater heats the spindles to release the clear frozen liquid therefrom. The frozen liquid falls into the bin beneath.

---

This invention relates to a method of and an apparatus for rotating a refrigerated spindle immersed in a liquid to be frozen to form clear frozen liquid.

The demand for ice cubes is increasing and domestic ice makers are now incorporated in many household refrigerators. These have been widely sold. However, many persons object to the unclear ice produced by such ice makers.

It is, therefore, an object of this invention to provide an improved method of and apparatus for making clear frozen liquid by cooling a spindle below the freezing temperature of a liquid to be frozen and immersing its lower end in this liquid while it is rotated at such a speed which will cause the freezing of clear frozen liquid thereon.

Further objects and advantages of the present invention will be apparent from the following description, reference being had to the accompanying drawings, wherein preferred embodiments of the present invention are clearly shown.

In the drawings:

The figure is a perspective view, partly diagrammatic, illustrating one embodiment of our invention.

Referring now to the drawing, there is shown a large collecting bin 20 beneath the major portion of the apparatus for collecting the frozen liquid. Above this collecting bin is a movable trough 22 for the liquid such as water shown in its upper freezing position. This trough is maintained substantially filled by a water or liquid supply 24 which supplies the water or liquid under the control of a suitable valve 26 and an insulated delivery pipe 28.

Immersed in the water or liquid 30 in the trough 22 are a plurality of rotatable spindle members 32 formed of aluminum rods which preferably have a diameter of about one-half inch. These are immersed in the liquid to a depth of about 1½ inches. These rods or spindle members 32 project through bearing apertures in the bottom of the plastic casing 34. Above the bottom wall of the casing 34 the spindle members 32 are provided with meshing gears or rollers 36 which are driven by a pinion 38 meshing with one of the gears 36. This pinion 38 is driven by a suitable electric motor 40. Above the gears 36 the spindle members 32 are provided with closely spaced fins 42 which are spaced about ten to the inch over a distance of about 2 inches to provide twenty fins. If desired, above the fins 42 there may be provided a hollow tubular support 44 providing upper bearings 46 for the spindle members. While spindle members of one-half inch diameter aluminum rods are preferred, other heat conductive materials and larger or smaller diameters may be used if desired.

For cooling the spindle member 32 below the freezing temperature of the liquid 30, there is provided above the tubular support 44 a refrigerant expansion coil 48 which may be connected to a suitable motor compressor and condenser unit (not shown) and provided with a suitable expansion valve or restrictor to complete the refrigerating system. A fan 50 driven by an electric motor 52 circulates the air within the plastic casing 34 through the evaporator coil 48 and into contact with the fins 42 upon the spindle member 32. Since the fins 42 rotate with the spindle members 32 there will be good heat transfer between the circulating air or other medium within the plastic container 34 with the fins 42 so as to provide excellent cooling for the spindle members 32.

The spindle members 32 during the freezing period may be maintained at a temperature of between 25° F. and —10° F. with temperatures of about 0° F. being preferred. The speed of rotation of the spindle members 32 depends upon their diameter and their temperature. The maximum speed must be below the speed which will produce cavitation. If the spindle or rod is one-half inch in diameter, the speed when freezing water should not be greater than 300 r.p.m. nor less than 30 r.p.m. A suitable speed for the spindle at a spindle temperature of 25° F. when freezing water is 30 r.p.m. If the spindle is maintained at a temperature of about 0° F., a suitable spindle speed when freezing water is 50 r.p.m. If the temperature of the spindle member 32 is maintained at about —10° F., a suitable spindle speed when freezing water is about 60 r.p.m. Spindles of larger or smaller diameters may be used. When freezing water, their surface speed should be maintained at about the same surface speed maintained for the one-half inch diameter spindle members at the various temperatures set forth above. Preferably, the spindle speed is no greater than that required to make clear ice or clear frozen liquid since higher speeds will retard the freezing due to the friction between the water and the spindle. However, spindle speeds substantially less than 30 r.p.m. appear not to produce clear ice and therefore should be avoided.

When the frozen liquid 54 freezes onto the lower portion of the spindle members 32 to the extent desired, the water trough 22 is provided with a pair of brackets to its dotted line position. Preferably this is done through some form of parallel linkage and operated automatically through an automatically controlled power operated mechanism. For the purpose of illustrating one form of this, the water trough 22 is provided with a pair of brackets 56 to which are pivotally connected a pair of arms 58 which are pivotally connected by the pins 60 to a pair of supporting arms 62 extending from the casing 34. An air operating cylinder 64 is provided for moving the water trough 22 between the full line position and the dotted line position and a return. This air cylinder 64 is connected by a piston rod 66 to one of the arms 58 to perform this operation.

After the water trough 22 is moved to the dotted line position, the dampers 68 are closed and the motors 40 and 52 deenergized. A radient electric heater 70 is then energized to heat the surrounding air and the fins 42 sufficiently to melt and release the frozen formations 54 thereby releasing them so that they drop into the collecting bin 20 from which they are taken for use. After the ice formation 54 has been harvested, the air cylinder 64 is operated to return the trough 22 to its full line position. At this time, replacement water or liquid may be added under the control of the valve 26 to restore a proper level of immersion of the spindle members 32. The dampers 68 are reopened and the motors 40 and 52 are reenergized to rotate the spindle members 32 at a suitable speed and to cool the spindle members through the fins 42 for a second freezing period.

While the embodiments of the invention as herein disclosed constitute preferred forms, it is to be understood that other forms might be adopted.

We claim:

1. A liquid freezer for providing clear frozen formations including a rotatable spindle having external freezing surfaces on which liquid is to be frozen and accumulated in a clear frozen formation, said spindle having an upwardly extending axis of rotation within and coaxial with said external freezing surfaces, means for contacting said spindle with the liquid to be frozen, means separate from the liquid to be frozen for cooling said external surfaces of said spindle substantially below the freezing temperature of said liquid to be frozen to cause the frozen liquid to accumulate thereon, wherein the improvement comprises means for rotating said spindle upon its upwardly extending axis of rotation during the accumulation of the frozen liquid thereon until a clear frozen formation of the desired amount has accumulated thereon, means for removing said spindle with the formation thereon from the liquid to be frozen, means for heating said spindle to remove the formation of frozen liquid from said spindle, and collecting means for collecting the formation of frozen liquid removed from said spindle.

2. A liquid freezer for providing clear frozen formations including a rotatable spindle having external freezing surfaces on which liquid is to be frozen and accumulated in a clear frozen formation, said spindle having an upwardly extending axis of rotation coaxial with said external freezing surfaces, means for immersing the lower end of said rotatable spindle into the liquid to be frozen, means for cooling the upper portion of said spindle to temperatures substantially below the freezing temperature of the liquid to be frozen to cause the frozen liquid to accumulate thereon, wherein the improvement comprises means for rotating said spindle upon its upwardly extending axis of rotation while immersed in and relative to said liquid to be frozen during the accumulation of the frozen liquid surrounding the external surfaces of said spindle until a clear frozen formation of the desired size has accumulated thereon, means for withdrawing said spindle from said liquid and means for removing the frozen liquid from said spindle.

3. A liquid freezer for providing clear frozen formations including a downwardly extending member having an upwardly extending axis of rotation and having external freezing surfaces coaxial with and closely surrounding said axis of rotation on which liquid is to be frozen and accumulated in a clear frozen formation, means for cooling said member to temperatures substantially below the freezing temperature of said liquid to be frozen, wherein the improvement comprises a movable container containing the liquid to be frozen which is movable relative to said downwardly extending member, said container having a top opening, means for moving said container to a position immersing the lower portion of said member in said liquid to be frozen, and means for rotating said member upon said upwardly extending axis during this immersing until a clear formation of frozen liquid of the desired size has accumulated thereon.

4. A liquid freezer for providing clear frozen formations including a downwardly extending rotatable spindle having an upwardly extending axis of rotation and having external freezing surfaces coaxial with said axis on which liquid is to be frozen and accumulated in a clear frozen formation, means for cooling said spindle to temperatures substantially below the freezing temperature of said liquid to be frozen to cause frozen liquid to accumulate thereon, wherein the improvement comprises a movable container containing the liquid to be frozen, said container having a top opening, means for moving said container to a position immersing the lower portion of said spindle in said liquid to be frozen, means for rotating said spindle upon said upwardly extending axis during its immersion and the freezing of the liquid thereon until a clear frozen formation of the desired size has accumulated thereon, means for removing said container relative to said spindle downwardly and laterally out from under said spindle, means for heating said spindle while said container is removed to remove the clear frozen formation therefrom, and collecting means located beneath said spindle for collecting the clear frozen formation removed from it.

5. The method of making clear frozen liquid formation which includes cooling a rotatable spindle member below the freezing temperature of the liquid to be frozen thereon, immersing the lower end of said spindle member in the liquid to be frozen until a clear formation of the desired size freezes thereon, wherein the improvement comprises rotating the spindle member upon an upright axis at a speed of between 30 and 300 r.p.m. during the freezing of the liquid thereon until a clear frozen formation of the desired size has accumulated thereon.

6. A liquid freezer for providing clear frozen formations including a rotatable member having external freezing surfaces on which the liquid is to be frozen and accumulated in a clear frozen formation, said member having an upwardly extending axis of rotation, said member throughout closely embracing said upwardly extending axis of rotation and having its external freezing surfaces coaxial with said upwardly extending axis of rotation, means for immersing said external freezing surfaces in said liquid to be frozen, means separate from said liquid to be frozen for cooling said external freezing surfaces substantially below the freezing temperature of said liquid to be frozen to cause the liquid too freeze and accumulate thereon around said member and its axis, wherein the improvement comprises means for rotating said member upon its upwardly extending axis of rotation with its external freezing surfaces immersed in the liquid to be frozen during the accumulation of the frozen liquid thereon until a clear frozen formation of the desired amount has accumulated, means for removing said member with the formation thereon from the liquid to be frozen, and means effective after the removal of said member from the liquid for removing the formation of frozen liquid from said member.

References Cited

UNITED STATES PATENTS 2,934,912   5/1960   Rodgers _____ 62—354 X

WILLIAM E. WAYNER, Primary Examiner

U.S. Cl. X.R.

62—346

PO-1050
(5/69)

UNITED STATES PATENT OFFICE
CERTIFICATE OF CORRECTION

Patent No. 3,482,413            Dated December 9, 1969

Inventor(s) Leonard J. Mann    - and-    Victor A. Williamitis

It is certified that error appears in the above-identified patent and that said Letters Patent are hereby corrected as shown below:

Column 2, line 45:

Delete "provided with a pair of brackets" and insert

-- moved from its full line position --.

Column 4, line 61 et seq.:

Insert the following:

-- 2,657,549    11/1953     Wenzelberger----62-346X
   2,749,722    6/1956      Knowles---------62-346
   3,146,606    9/1964      Grimes et al----62-345
   3,380,261    4/1968      Hendrix et al---62-138     4/4/66

Foreign Reference 522,487    4/1955      Italy-----------62-346    --.

SIGNED AND
SEALED
JUN 23 1970

(SEAL)
Attest:

Edward M. Fletcher, Jr.
Attesting Officer

WILLIAM E. SCHUYLER, JR.
Commissioner of Patents